(12) United States Patent
Kettner-Reich et al.

(10) Patent No.: US 8,813,941 B2
(45) Date of Patent: Aug. 26, 2014

(54) WORKPIECE SUPPORT SYSTEMS AND RELATED MACHINES

(75) Inventors: Andreas Kettner-Reich, Stuttgart (DE); Tobias Meck, Stuttgart (DE); Martin Petera, Sindelfingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 13/362,055

(22) Filed: Jan. 31, 2012

(65) Prior Publication Data

US 2012/0145515 A1 Jun. 14, 2012

Related U.S. Application Data

(63) Continuation of application No. PCT/EP2010/003056, filed on May 19, 2010.

(30) Foreign Application Priority Data

Jul. 31, 2009 (DE) .......................... 10 2009 035 804

(51) Int. Cl.
*B65G 43/00* (2006.01)
*B23Q 7/14* (2006.01)

(52) U.S. Cl.
CPC ............ *B23Q 7/1431* (2013.01); *B23Q 7/1426* (2013.01)
USPC ................... 198/346.1; 198/538; 414/222.07; 414/286; 269/138; 269/309

(58) Field of Classification Search
USPC ................. 198/346.1, 538; 414/222.07, 286; 269/138, 309
See application file for complete search history.

(56) References Cited

U.S. PATENT DOCUMENTS 4,531,720 A * 7/1985 Soder .............................. 269/71
4,664,579 A 5/1987 Schedwin
(Continued)

FOREIGN PATENT DOCUMENTS

DE 102006002000 A1 7/2007
EP 0391707 A1 10/1990
(Continued)

OTHER PUBLICATIONS http://www.trumpf-machines.com/en/products/2d-laser-cutting/laser-cutting-machines/trulaser-series-3000/trulaser-3030-lean-edition.html.*

(Continued)

*Primary Examiner* — Joseph Dillon, Jr.
(74) *Attorney, Agent, or Firm* — Fish & Richardson P.C.

(57) ABSTRACT

In some aspects, a workpiece processing installation includes an operating area, an operating pallet able to be moved along a transport direction between a position within the operating area and a position outside the operating area, the operating pallet being configured to support a workpiece, and a pallet support that is configured to be transferred from a first position, in which the pallet support defines a storage area for the storage of the operating pallet outside the operating area, to a second position in which the pallet support protrudes away from the operating area in the transport direction to a lesser extent than it does in the first position. Transferring the pallet support from the first position to the second position includes moving at least a portion of the pallet support towards the operating area which results in the storage area defined by the pallet support becoming smaller.

12 Claims, 3 Drawing Sheets

(56) References Cited

U.S. PATENT DOCUMENTS

| | | | |
|---|---|---|---|
| 4,993,906 A * | 2/1991 | Nisimura et al. | 414/286 |
| 5,113,920 A * | 5/1992 | Sedeniussen | 144/286.5 |
| 5,156,254 A | 10/1992 | Kitamura et al. | |
| 5,487,445 A * | 1/1996 | Biehl | 182/181.1 |
| 5,782,279 A * | 7/1998 | Stecker, Sr. | 144/286.1 |
| 6,183,188 B1 | 2/2001 | Randazzo et al. | |
| 6,213,279 B1 * | 4/2001 | Killingbeck et al. | 198/346.1 |
| 6,647,605 B2 * | 11/2003 | Hiramoto et al. | 29/33 P |
| 7,377,504 B2 * | 5/2008 | Houldsworth | 269/296 |
| 7,522,151 B2 * | 4/2009 | Arakawa et al. | 345/156 |
| 7,640,642 B2 * | 1/2010 | Okanda | 29/33 P |
| 8,215,296 B1 * | 7/2012 | Cisneros | 125/35 |
| 2005/0218577 A1 * | 10/2005 | Kent | 269/139 |
| 2006/0001644 A1 | 1/2006 | Arakawa et al. | |
| 2008/0150244 A1 * | 6/2008 | Carlei | 280/35 |
| 2009/0001644 A1 | 1/2009 | Hinderer et al. | |
| 2009/0074529 A1 * | 3/2009 | Okanda | 409/225 |
| 2010/0213658 A1 * | 8/2010 | Huber | 269/289 R |
| 2012/0267920 A1 * | 10/2012 | Voris | 297/16.1 |

FOREIGN PATENT DOCUMENTS

| | | |
|---|---|---|
| JP | 3116315 | 12/1991 |
| JP | 446728 | 2/1992 |
| JP | 10193236 | 7/1998 |
| JP | 2008055554 A | 3/2008 |

OTHER PUBLICATIONS http://source.theengineer.co.uk/production-and-automation/cutting-tools/laser-cutting/trulaser-3030-new-to-appear-at-open08/325260. article.*

20121210121352247.pdf.*

20121210122134639.pdf.*

Notification Concerning Transmittal of International Preliminary Report on Patentability and Written Opinion for corresponding PCT Application No. PCT/EP2010/003056, mailed Jan. 31, 2012, 8 pages.

International Search Report from corresponding PCT Application No. PCT/EP2010/003056, mailed Sep. 24, 2010, 2 pages.

* cited by examiner

WORKPIECE SUPPORT SYSTEMS AND RELATED MACHINES

CROSS-REFERENCE TO RELATED APPLICATIONS

This application is a continuation of, and claims priority under 35 U.S.C. §120 to, PCT Application No. PCT/EP2010/003056, filed on May 19, 2010, which claims priority to German Patent Application No. 2009 035 804.8, filed on Jul. 31, 2009. The contents of both of these priority applications are hereby incorporated by reference in their entirety.

TECHNICAL FIELD

This invention relates to workpiece support systems and related machines.

BACKGROUND

In laser processing (e.g., for laser processing workpieces), an operating area of a mechanical workpiece processing installation is typically surrounded for safety reasons, for example, by a beam protection housing. Due to the encapsulation of the operating area of the laser processing installation, the operating area can be difficult to access, for example, for providing the installation with workpieces.

U.S. Pat. No. 5,156,254 describes a mechanical installation in which a workpiece is arranged for processing on an operating pallet or workpiece support that can be transported together with the workpiece supported thereon into the operating enclosure of a processing machine. After the workpiece processing operation, the operating pallet can be transported together with the processed workpiece out of the operating enclosure. The operating pallet that is arranged outside the operating enclosure is more readily accessible, for example, for connecting to a pallet changing device.

A bearing frame provided with guide rails supports the operating pallet that is transported from the operating enclosure. Such processing installations, in addition to the operating enclosure, can require relatively large floor space.

SUMMARY

In some aspects of the invention, a workpiece processing installation (e.g., a mechanical workpiece processing installation) including a workpiece processing machine and a pallet support for the workpiece processing machine can be produced to occupy less space (e.g., less floor space) than certain conventional systems.

In one aspect, a mechanical workpiece processing installation includes an operating area, an operating pallet configured to support a workpiece and able to be moved along a transport direction between a position within the operating area and a position outside the operating area, and a pallet support. The pallet support is configured to be transferred from a first position, in which the pallet support defines a storage area outside the operating area for the storage of the operating pallet, to a second position, towards the operating area, in which the pallet support protrudes away from the operating area in the transport direction to a lesser extent than it does in the first position. Transferring the pallet support from the first position to the second position includes moving at least a portion of the pallet support towards the operating area with the storage area defined and limited by the pallet support becoming smaller.

In another aspect, a pallet support for a mechanical workpiece processing installation having a workpiece processing machine having an operating area includes a support surface on which an operating pallet configured to carry a workpiece can be supported. The pallet support can be positioned relative to the workpiece processing machine and the pallet support is configured so that the pallet support can be transferred from a first position to a second position in which the pallet support protrudes away from the operating area in the transport direction to a lesser extent than it does in the first position. Transferring the pallet support from the first position to the second position includes moving a portion of the pallet support towards the operating area.

In some embodiments, the pallet support can be transferred from a first position (e.g., a bearing position) to a second position (e.g., a space-saving position). In the space-saving position, the pallet support protrudes from the operating area in the transport direction to a lesser extent than it does in the bearing position. This is enabled by at least a portion of the pallet support being able to be moved towards the operating area of the mechanical installation. During the movement, a storage area for the storage of the operating pallet defined by the pallet support is reduced in size or even eliminated.

The pallet support is not installed in a fixed manner beside the operating area of a mechanical workpiece processing installation, but is at least partially movable relative to the operating area. The relative movability of the pallet support is configured in such a manner that the pallet support can be moved (e.g., pushed, pivoted, folded, or otherwise moved) in a space saving manner towards the operating area.

The bearing of the movable portions of the pallet support can be constructed in different ways. For example, the pallet support can have telescoping members, folding arms, or other structural configurations.

In the space-saving position, the pallet support is arranged close to the operating area in a space-saving manner. Therefore, it can be moved back to the bearing position for supporting the pallet quickly and easily.

In some embodiments, a slot for the pallet support, in which it can be pushed in the space-saving position, can be provided at the side of the operating area, for example, in a machine body. In other embodiments, the pallet support is substantially independent of other devices of the mechanical processing installation and can be installed separately. As a result, a processing machine can be retrofit to include a pallet support.

In some embodiments, the pallet support has at least one bearing that movably supports a portion of the pallet support that is moved in order to transfer the pallet support into various positions. The moved portion of the pallet support is consequently guided at least by the bearing during a transfer movement. The guided transfer movement results in simple and functionally reliable handling of the pallet support.

In some embodiments, the pallet support is at least partially pivotable in order to be transferred from the bearing position into the space-saving position. Such embodiments can reduce the need for expensive or complex linear bearings, such as, for example, telescopic carrying arms.

In a configuration in which the pallet support is at least partially pivotable about a vertical pivot axis, forces required for the transfer movement can be reduced. Due to the vertical arrangement of the pivot axis, the transfer movement is carried out in a horizontal direction. Therefore the pallet support does not need to be raised vertically when it is moved between the bearing position and the space-saving position. Additionally, the movable portion of the pallet support can be supported on the ground in a simple manner during the horizontal transfer movement, for example, by using rollers.

In some embodiments, the pallet support has at least one carrier member, for example, a support profile, whose longitudinal axis in the bearing position extends along the transport direction. As a result of the use of at least one carrier member, a stable and lightweight construction of the pallet support can be obtained. By at least one end of the carrier member, which is arranged away from the operating area when the pallet support is in the bearing position, being able to be moved towards the operating area, the spatial requirements of the pallet support can be reduced in an efficient manner by the transfer movement into the space-saving position.

In some embodiments, the pallet support includes at least two carrier members, for example, support profiles. Furthermore, flexible handling of the pallet support can be achieved when the carrier members can be pivoted independently of each other and in a sequential manner about different pivot axes.

In some embodiments, in the space-saving position, the longitudinal axis of at least one carrier member of the pallet support extends substantially perpendicular relative to the transport direction. In such embodiments, the space reduction by transferring the pallet support into the space-saving position can be particularly large. In some embodiments, the carrier members of the pallet support at least partially overlap each other transversely relative to the transport direction in the space-saving position of the pallet support. Furthermore, a pallet support can be produced that can be folded together and have relatively long carrier members which can nonetheless be arranged together at one side of the operating area.

In some embodiments, an operating pallet is supported at least partially on the pallet support during the transport movement which can increase the reliability of the operating pallet transport. Furthermore, the need for bearing devices, in addition to the pallet support outside the operating area, can be reduced.

In some embodiments, the operational reliability of the operating pallet transport is increased using a guiding device that is provided on the pallet support and by which the operating pallet is at least partially guided during the transport movement. Furthermore, the handling of the mechanical workpiece processing installation can be simplified by guiding the operating pallet during the transport movement.

In some embodiments, the additional guiding function of the pallet support is achieved in a simple way by a guiding device for the operating pallet being formed by guiding elements provided on carrier members of the pallet support. Advantageously, the guiding elements on the carrier members can be aligned in the transport direction with guiding elements in the operating area when the pallet support is arranged in the bearing position.

In some embodiments, a workpiece supported on an operating pallet that is transported from the operating area is more easily accessible. In particular, the accessibility along a side of the operating pallet facing the operating area is increased.

The details of one or more embodiments of the invention are set forth in the accompanying drawings and the description below. Other aspects, features, and advantages of the invention will be apparent from the description and drawings, and from the claims.

DETAILED DESCRIPTION

Figure 1:
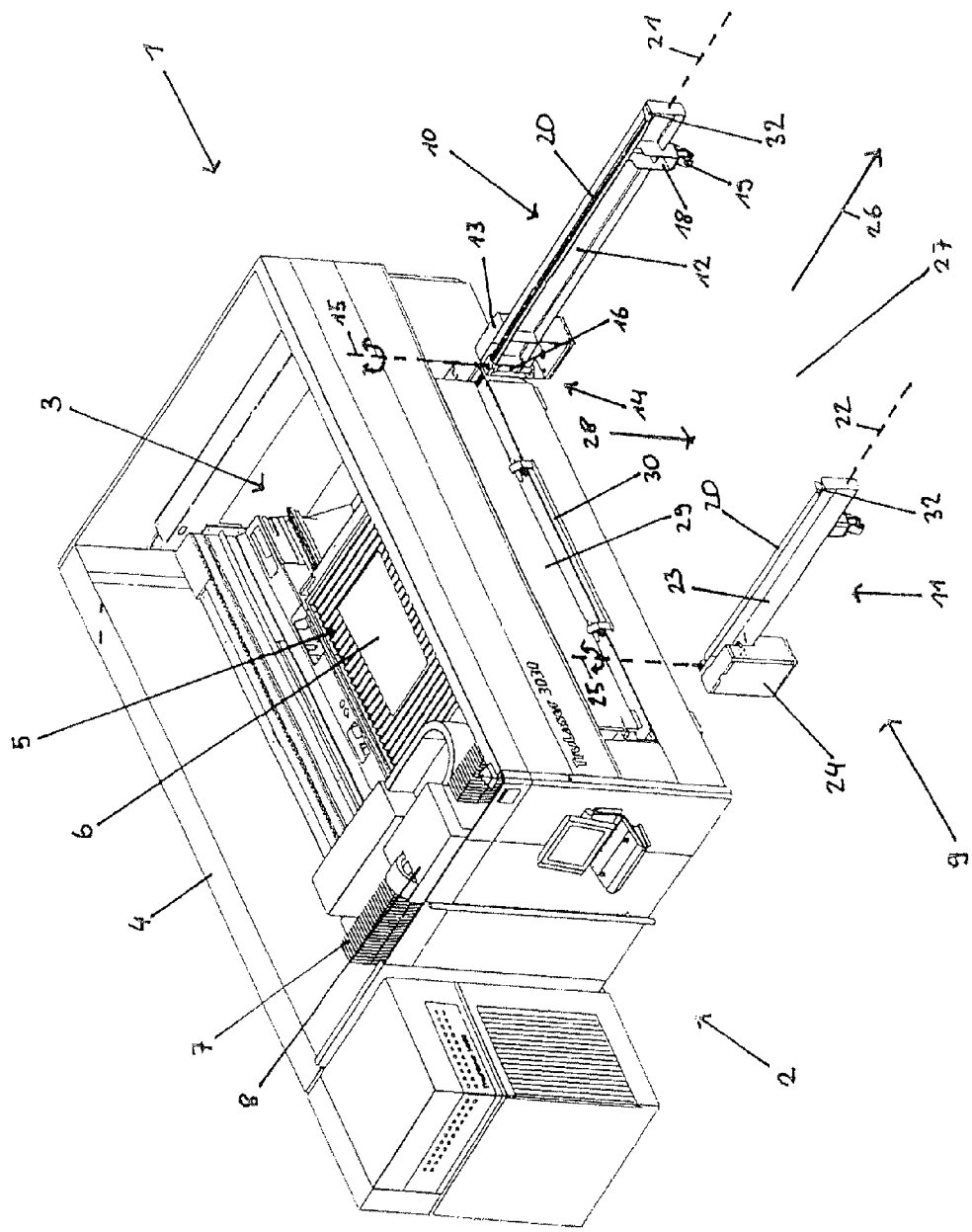
FIG. 1 is a perspective view of a laser processing installation having a pallet support arranged in a bearing position.

FIG. 1 shows a laser processing installation 1 that has a laser cutting machine 2 for laser cutting plate-like workpieces (e.g., metal sheets). An operating area 3 of the laser cutting machine 2 is surrounded by a housing 4. An operating pallet 5 on which a workpiece (e.g., a sheet metal plate) 6 can be supported is arranged in the operating area 3 of the laser cutting machine 2. The sheet metal plate 6 supported on the operating pallet 5 can be processed by a cutting laser beam that is provided by a laser cutting head 8 that can be moved over the sheet metal plate 6 on a guiding system 7. Using the laser beam, various sheet metal cut-outs can be cut from the sheet metal plate 6.

A pallet support 9 is arranged beside the laser cutting machine 2 and outside the operating area 3 of the laser cutting machine 2. The pallet support 9 has two carrier-arm assemblies 10 and 11.

The carrier arm assembly 10 has a carrier member (e.g., a carrier arm) 12 that is formed by a support profile and is supported on a column 13 by a pivot bearing 14 so as to be able to be pivoted about a vertical pivot axis 15. The pivot bearing 14 is formed by a shaft 16 of the carrier arm 12 that is rotatably received at both ends in bearing sleeves in the form of flange sleeves of bronze. A clearance between the upper bearing sleeve and the shaft 16 prevents blocking of the rotary bearing 14 during a pivot movement. A movement damper (not shown) controls the pivot movement of the carrier arm 12.

The column 13 is secured (e.g., fastened) to a base. A releasable locking connection 17 (shown in FIG. 2) is provided in order to retain the carrier arm 12 in the pivot position shown in FIG. 1.

At an end of the carrier arm 12 that is away from (e.g., opposite) the column 13, a bracket 18 is positioned. The bracket 18 has a roller 19 at its lower side. Spacing between the roller 19 and the carrier arm 12 is adjustable to help ensure that the carrier arm 12 is supported on the ground by the bracket 18 even in the event of unevenness of the ground.

At the upper side of the carrier arm 12, a guiding element in the form of a guide rail 20 extends along the longitudinal axis 21 of the carrier arm 12.

The structure of the carrier arm assembly 11 substantially corresponds to the structure of the carrier arm assembly 10. In particular, the carrier arm assembly 11 has a carrier member (e.g., a carrier arm) 23 that is formed by a support profile that extends along a longitudinal axis 22 and is pivotably supported on a fixed column 24 about a vertical pivot axis 25. Differences in the construction of the carrier arm assemblies 10 and 11 exist substantially only with regard to the length of the carrier arms (support profiles) 12 and 23.

As shown in FIG. 1, the column 13 of the carrier arm assembly 10 is arranged close to (e.g., in contact with) the housing 4. In contrast, the column 24 of the carrier arm assembly 11 is spaced apart from the housing 4 in a transport direction 26. This spacing results in the carrier arms 12 and 13 having different lengths.

In the configuration of the laser processing installation 1 shown in FIG. 1, the pallet support 9 is arranged in a bearing position. The carrier arms 12 and 23 are arranged parallel to each other. Their longitudinal axes 21 and 22 extend parallel to the transport direction 26. Between the carrier arm assemblies 10 and 11, an accessible free space 27 is formed through which, for example, an operator can reach the operating area 3. The pallet support 9 protrudes a relatively large distance from the operating area 3 in the transport direction 26. In some embodiments, the carrier arms 12 and 23 define and limit the size of a horizontal storage area 28 for storing an operating pallet 5. For example, the storage area 28 can be defined by an area between the carrier arms 12 and 23.

Figure 2:
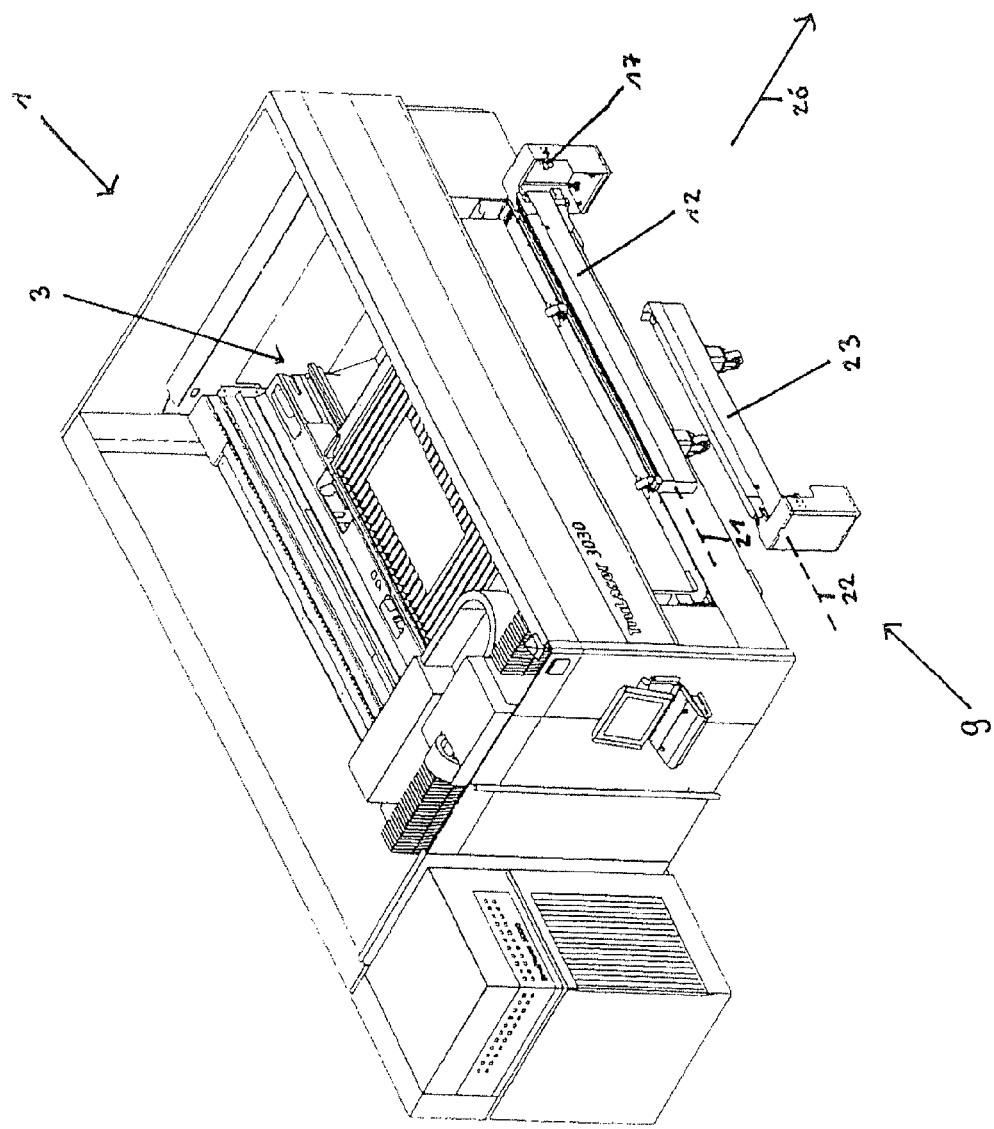
FIG. 2 is a perspective view of the laser processing installation of FIG. 1 with the pallet support arranged in a space-saving position.

Starting from the bearing position shown in FIG. 1, the pallet support 9 can be transferred into a space-saving position (shown in FIG. 2). To be transferred to the space-saving position, after releasing the locking connection 17, the carrier arm 12 is first pivoted about 90° by an operator into a position in which its longitudinal axis 21 extends transversely relative to the transport direction 26. During the transfer pivot movement of the carrier arm 12, the end of the carrier arm 12 opposite the column 13 moves towards the operating area 3. During the pivot movement, the carrier arm 12 is supported on the ground by the roller 19. As a result of pivoting the carrier arm 12, the size of the storage area 28 defined by the pallet support 9 is reduced. For example, the area defined by the carrier arms 12 and 23 is reduced.

Subsequently, the carrier arm 23 is pivoted in a similar manner as the carrier arm 12 but in the opposite direction of rotation. After the carrier arm 23 is pivoted, the longitudinal axis 22 of the carrier arm 23 extends transversely relative to the transport direction 26 in the same manner as the longitudinal axis 21 of the carrier arm 12.

The pallet support 9 is now arranged in the space-saving configuration shown in FIG. 2. The carrier arms 12 and 23 are arranged so as to partially overlap each other transversely relative to the transport direction 26 and along a lateral wall of the housing 4. In the space-saving position, the pallet support 9 protrudes from the operating area 3 in the transport direction 26 to a lesser extent than it does in the bearing position.

The pallet support 9 can accordingly be pivoted back into the bearing position shown in FIG. 1.

The procedure of transporting the operating pallet 5 out of the operating area 3 of the laser cutting machine 2 will be described below.

Before moving the operating pallet 5, the pallet support 9 is first arranged in its bearing position (shown in FIG. 1). An operator standing in front of the laser cutting machine 2 opens an aperture of the housing 4 that is closed with a flap 29. To do so, the flap 29 can be pivoted upwards using a handle 30. Then, the operator grips the operating pallet 5 through the aperture and pulls it from the operating area 3 in the transport direction 26. Alternatively, one or more electromechanical drive devices (e.g., actuators) can be used to move the operating pallet 5.

At the beginning of the transport movement, the operating pallet 5 moves on guide rails 31 (partially shown in FIG. 3) that are arranged in the operating area 3. The guide rails 31 are aligned in the transport direction 26 with the guide rails 20 on the carrier arms 12 and 23. When the operating pallet 5 moves out of the operating area 3 or the housing 4 in the transport direction 26, it first rests only on the carrier arm assembly 10. With continued movement in the transport direction, the operating pallet 5 then also rests on the carrier arm assembly 11. At the lower side of the operating pallet 5, guiding carriages cooperate both with the carrier-arm-side guide rails 20 and with the machine-side guide rails 31 to guide the operating pallet 5 during the transport movement. The transport movement ends when the operating pallet 5 abuts stops 32 arranged at the ends of the carrier arms 12 and 23 opposite the operating area 3.

Figure 3:
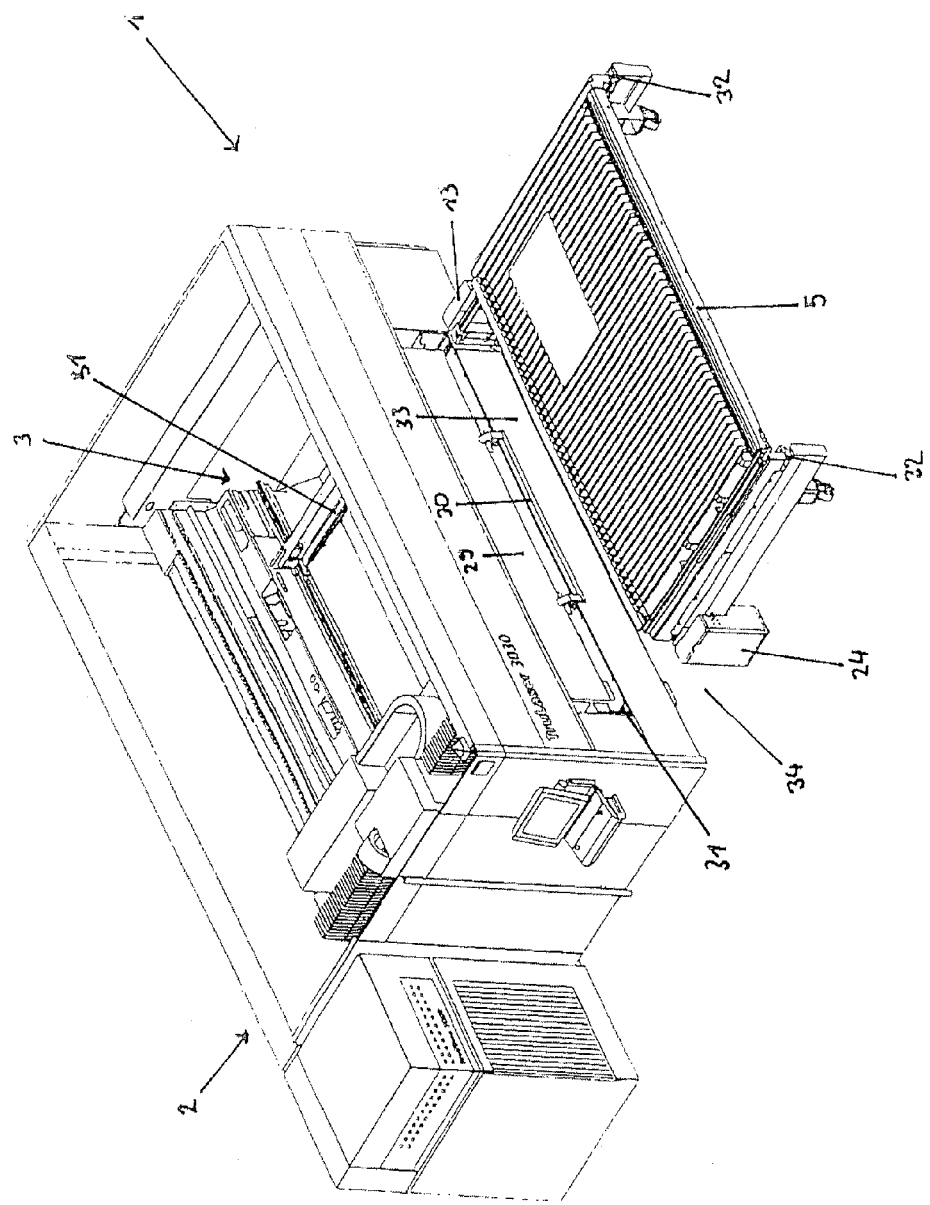
FIG. 3 is a perspective view of the laser processing installation of FIG. 1 with the pallet support arranged in the bearing position and an operating pallet supported on the pallet support.

FIG. 3 shows an arrangement when the operating pallet 5 has been completely moved out of the operating area 3 onto the pallet support 9. Between the operating pallet 5 and the housing 4, there is a free space 33 in which no components of the pallet support 9 are arranged other than the column 13 of the carrier arm assembly 10. Since the column 24 of the carrier arm assembly 11 is spaced apart from the housing 4 in the transport direction 26, a lateral opening 34 exists in the intermediate space 33. An operator can gain access through the lateral opening 34 into the intermediate space 33 in order to take out, for example, sheet metal cut-outs that have been cut from the operating pallet 5.

The embodiments shown in the Figures advantageously permit the operating pallet 5 to be first supported and guided during the transport movement by the guide rails 31 provided in the operating area 3 and then substantially seamlessly also by the guide rail 20 on the carrier arm assembly 10.

After, for example, the metal sheet cut-outs have been removed from the operating pallet 5 and the operating pallet 5 has been loaded with a new blank sheet metal plate 6, the operating pallet 5 can again be pushed back into the operating area 3.

While the column 13 has been described as being arranged close to the housing 4, other configurations are possible. For example, alternatively, the column 13 can be spaced away from the housing 4 so that the intermediate space 33 has an opening at both opposite sides.

While the laser the workpiece support systems described herein have been described as being used with a laser processing installation, other implementations are possible. For example, in some embodiments, the pallet support is used with other types of workpiece processing machines.

A number of embodiments of the invention have been described. Nevertheless, it will be understood that various modifications may be made without departing from the spirit and scope of the invention. Accordingly, other embodiments are within the scope of the following claims.

What is claimed is:

1. A workpiece processing installation comprising:
   a housing that defines an operating area;
   an operating pallet able to be moved along a transport direction between a position within the operating area and a position outside the operating area, the operating pallet being configured to support a workpiece; and
   a pallet support comprising a first carrier member and a second carrier member that define a storage area therebetween for storing the operating pallet outside of the operating area, wherein the first carrier member is pivotably connected to a first column of the pallet support that allows the first carrier member to pivot about a vertical axis of the first column to move towards the operating area, and the second carrier member is pivotably connected to a second column of the pallet support that allows the second carrier member to pivot about a vertical axis of the second column to move towards the operating area, such that the pallet support can be transferred from a first position, in which the first and second carrier members protrude away from the operating area, to a second position, in which the first and second carrier members are positioned substantially perpendicular to the transport direction and at least partially overlap each other transversely relative to the transport-direction, such that the first and second carrier members protrude away from the operating area in the transport direction to a lesser extent than in the first position, wherein one of the first and second columns is spaced apart from the housing by a greater distance than the other of the first and second columns, such that in the second position, the first and second carrier members can at least partially overlap each other transversely relative to the transport direction and along a wall of the housing, and wherein an arrangement of the first and second columns relative to the housing defines an intermediate space between the housing and the pallet support, and the intermediate space is bordered by a lateral opening defined between the housing and either of the first and second columns that is spaced apart from the housing by the greater distance than the other of the first and second columns.

2. The workpiece processing installation according to claim 1, wherein the pallet support has at least one bearing that movably supports at least one of the first or second carrier member.

3. The workpiece processing installation according to claim 1, wherein each of the first and second carrier members has a longitudinal axis that extends along the transport direction in the first position of the pallet support, and wherein an end of each of the first and second carrier members that is furthest from the operating area when the pallet support is in the first position can be moved towards the operating area.

4. The workpiece processing installation according to claim 1, wherein a longitudinal axis of each of the first and second carrier members of the pallet support extends substantially transversely relative to the transport direction in the second position of the pallet support.

5. The workpiece processing installation according to claim 1, wherein the operating pallet at least partially rests on the pallet support during movement of the operating pallet between the position outside the operating area and the position within the operating area.

6. The workpiece processing installation according to claim 1, wherein the pallet support has a guiding device that at least partially guides the operating pallet during movement of the operating pallet between the position outside the operating area and the position within the operating area.

7. The workpiece processing installation according to claim 6, wherein the guiding device is formed by guiding elements that are provided on the first and second carrier members of the pallet support.

8. The workpiece processing installation according to claim 1, wherein the operating pallet can be arranged on the pallet support in a position in which the intermediate space is formed between the operating pallet and the operating area.

9. The workpiece processing installation according to claim 8, wherein the intermediate space is accessible via the lateral opening.

10. The workpiece processing installation according to claim 3, wherein the first and second carrier members of the pallet support are in the form of a support profile.

11. The workpiece processing installation according to claim 1, wherein each of the first and second carrier members of the pallet support is in the form of a support profile.

12. The workpiece processing installation according to claim 1, wherein in the first position, the pallet support is configured to support the operating pallet, and in the second position, the storage area is eliminated such that the pallet support cannot support the operating pallet.

* * * * *